(12) United States Patent
Wang (10) Patent No.: US 10,713,487 B2
(45) Date of Patent: Jul. 14, 2020

(54) OBJECT DETERMINING SYSTEM AND ELECTRONIC APPARATUS APPLYING THE OBJECT DETERMINING SYSTEM

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 105 days.

(21) Appl. No.: 16/022,719

(22) Filed: Jun. 29, 2018

(65) Prior Publication Data

US 2020/0005039 A1 Jan. 2, 2020

(51) Int. Cl.
*G06K 9/00* (2006.01)

(52) U.S. Cl.
CPC ................. *G06K 9/00664* (2013.01)

(58) Field of Classification Search
CPC .................................................. G06K 9/00664
USPC .................................. 382/103, 238, 242, 190
See application file for complete search history.

(56) References Cited

U.S. PATENT DOCUMENTS

| | | | | |
|---|---|---|---|---|
| 2012/0062784 A1* | 3/2012 | Van Heugten | ....... | H04N 5/2254 348/340 |
| 2014/0207282 A1* | 7/2014 | Angle | .................... | G05B 15/02 700/257 |
| 2015/0127965 A1* | 5/2015 | Hong | .................... | H04L 9/3231 713/323 |
| 2015/0235366 A1* | 8/2015 | Lee | ........................ | G06T 9/00 382/118 |
| 2015/0347853 A1* | 12/2015 | Hwang | .............. | H04N 5/23229 348/135 |
| 2017/0185276 A1* | 6/2017 | Lee | ..................... | G06F 3/04847 |
| 2017/0361468 A1* | 12/2017 | Cheuvront | ............ | A47L 9/2857 |
| 2017/0363465 A1* | 12/2017 | Send | ........................ | G01C 3/06 |
| 2017/0363741 A1* | 12/2017 | Send | ...................... | G06F 3/0304 |
| 2018/0007343 A1* | 1/2018 | Send | ........................ | G01S 17/46 |
| 2018/0181196 A1* | 6/2018 | Lee | ..................... | H04N 5/23296 |
| 2018/0203559 A1* | 7/2018 | Choi | ........................ | G06F 3/016 |
| 2018/0276843 A1* | 9/2018 | Send | ........................ | G01C 3/06 |
| 2019/0130216 A1* | 5/2019 | Tomioka | .............. | G06K 9/6256 |
| 2019/0158819 A1* | 5/2019 | Hong | ..................... | G06F 1/1647 |
| 2019/0213438 A1* | 7/2019 | Jones | ....................... | A47L 9/009 |
| 2019/0337155 A1* | 11/2019 | Kwak | .................. | A47L 11/4011 |
| 2019/0339714 A1* | 11/2019 | Kwak | .................. | G05D 1/0295 |

\* cited by examiner

*Primary Examiner* — Marceau Milord
(74) *Attorney, Agent, or Firm* — Winston Hsu (57) ABSTRACT

Disclosed is an object determining system comprising an optical sensor, a kind determining circuit and an element analyzing circuit. The optical sensor comprises a kind determining region and an element analyzing region, wherein the optical sensor captures at least one object image of an object via the kind determining region, and acquires element analyzing optical data via the element analyzing region. The kind determining circuit is configured to determine an object kind of the object according to the object image. The element analyzing circuit is configured to analyze element of the object according to the element analyzing optical data and the object kind. An object determining system applying tow stage object sensing steps to determine an object kind is also disclosed.

7 Claims, 7 Drawing Sheets

OBJECT DETERMINING SYSTEM AND ELECTRONIC APPARATUS APPLYING THE OBJECT DETERMINING SYSTEM

BACKGROUND OF THE INVENTION

1. Field of the Invention

The present invention relates to an object determining system and an electronic apparatus applying the object determining system, and particularly relates an object determining system applying two stage steps and an electronic apparatus applying the object determining system.

2. Description of the Prior Art

A conventional sweetness meter can be applied to measure the sweetness level of an object based on a spectrum of the object. For example, a sweetness meter can emit light to an object and then calculates the sweetness level of the object based on a spectrum for reflected light from the object.

However, the conventional sweetness meter needs the user to set a proper object kind, or the calculated sweetness level maybe incorrect. For example, if the object is an apple but the user sets the object as a guava for sweetness calculating. The calculated sweetness level maybe incorrect.

Besides, a robot cleaner becomes more and more popular for each family. However, the conventional robot cleaner could not determine which is in front of it, thus may cause some terrible results if the robot cleaner moves over some objects need to be avoided.

SUMMARY OF THE INVENTION

One objective of the present invention is to provide an object determining system which can determine an object kind and then accordingly determine the object element.

One objective of the present invention is to provide an object determining system which can apply two stage sensing steps to determine an object kind.

One embodiment of the present application is to provide an object determining system comprising an optical sensor, a kind determining circuit and an element analyzing circuit. The optical sensor comprises a kind determining region and an element analyzing region, wherein the optical sensor captures at least one object image of an object via the kind determining region, and acquires element analyzing optical data via the element analyzing region. The kind determining circuit is configured to determine an object kind of the object according to the object image. The element analyzing circuit is configured to analyze element of the object according to the element analyzing optical data and the object kind.

An electronic apparatus applying the above-mentioned object determining system and can select an operation mode based on object element is also disclosed in another embodiment of the present invention.

Another embodiment discloses an object determining system comprising, a processing circuit, a first stage object sensor and a second stage object sensor. The first stage object sensor is configured to generate a first stage object sensing result. The second stage object sensor is configured to generate a second stage object sensing result of an object if the processing circuit determines the object exists in a predetermined range of the object determining system based on the first stage object sensing result. The processing circuit further determines an object kind of the object based on the second stage object sensing result.

In view of above-mentioned embodiments, the object kind or object element can be automatically acquired, and an electronic apparatus can correspondingly select a proper operation based on the object kind or object element. Therefore, the issues for prior art can be resolved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present application. Please note, the components in each embodiment can be implemented by hardware (ex. circuit or apparatus) or by firmware, software (ex. a processor installed with at least one program). Additionally, the components in each embodiment can be separated to more components or be integrated to fewer components. Also, the steps illustrated in following embodiments can be separated into more steps or integrated into fewer steps. Such variation should fall in the scope of the present application.

Figure 1:
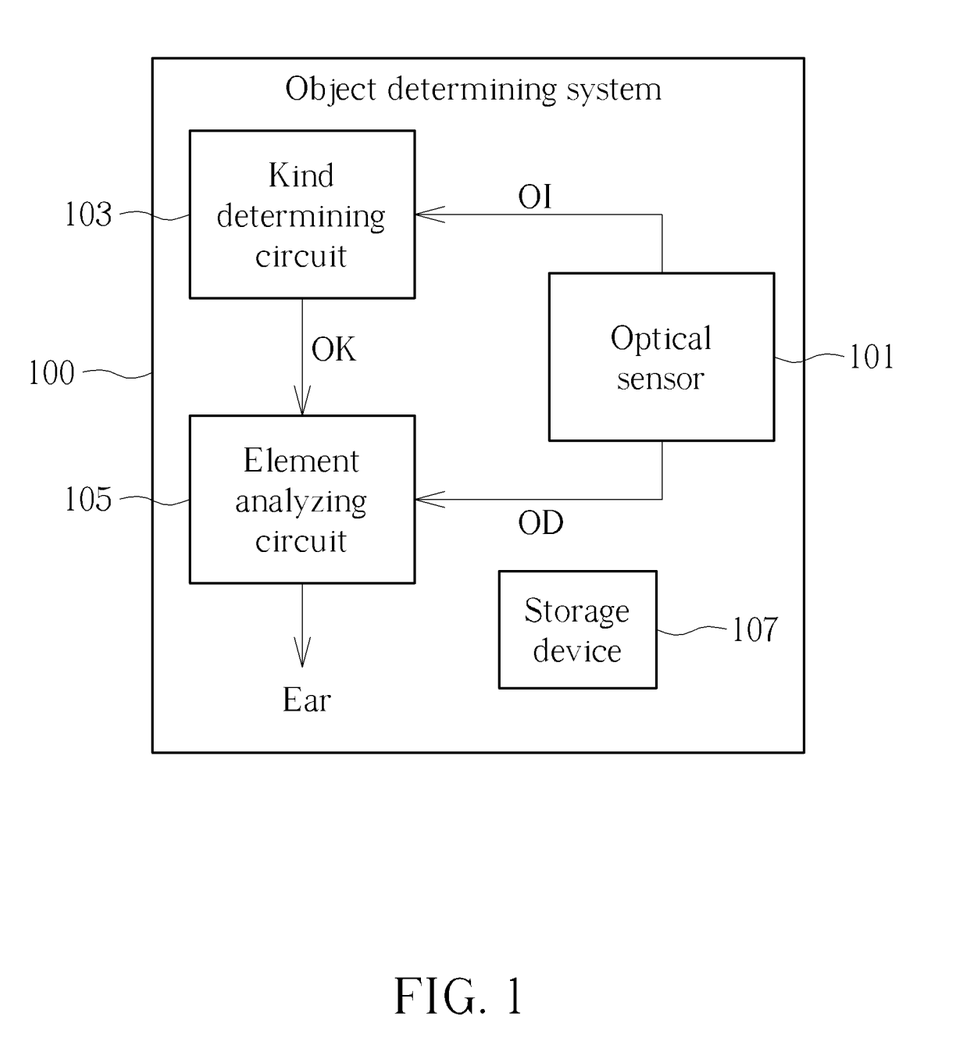
FIG. 1 is a block diagram illustrating an object determining system according to one embodiment of the present invention.

FIG. 1 is a block diagram illustrating an object determining system according to one embodiment of the present invention. As illustrated in FIG. 1, the object determining system 100 comprises an optical sensor 101, a kind determining circuit 103 and an element analyzing circuit 105. The optical sensor 101 is a sensor can generate an optical image OI and element analyzing optical data OD. The optical sensor 101 comprises a kind determining region and an element analyzing region. The optical sensor 101 captures at least one object image OI of an object via the kind determining region, and acquires element analyzing optical data OD via the element analyzing region. The kind determining region and the element analyzing region will be described for more details later. Also, the kind determining circuit 103 determines an object kind OK of the object according to the object image OI. Besides, the element analyzing circuit 105 analyzes element of the object according to the element analyzing optical data OD and the object kind OK, to generate an element analyzing result Ear.

In one embodiment, the kind determining region and the element analyzing region are defined by color filters provided on the optical sensor 101. For more detail, a normal color filter such as a RGB color filter or a CMYG color filter is provided on the kind determining region, and a multi-spectral color filter is provided on the element analyzing region. The multi-spectral color filter can be, for example, a color filter array has multi parts, and each part comprises color filters having spectrums different from other parts. Therefore, the abovementioned element analyzing optical data OD can be a spectrum of the object. Thus the element analyzing circuit 105 can analyze the element of the object based on the element analyzing optical data OD. However, the kind determining region and the element analyzing region can be defined by other methods.

Figure 2:
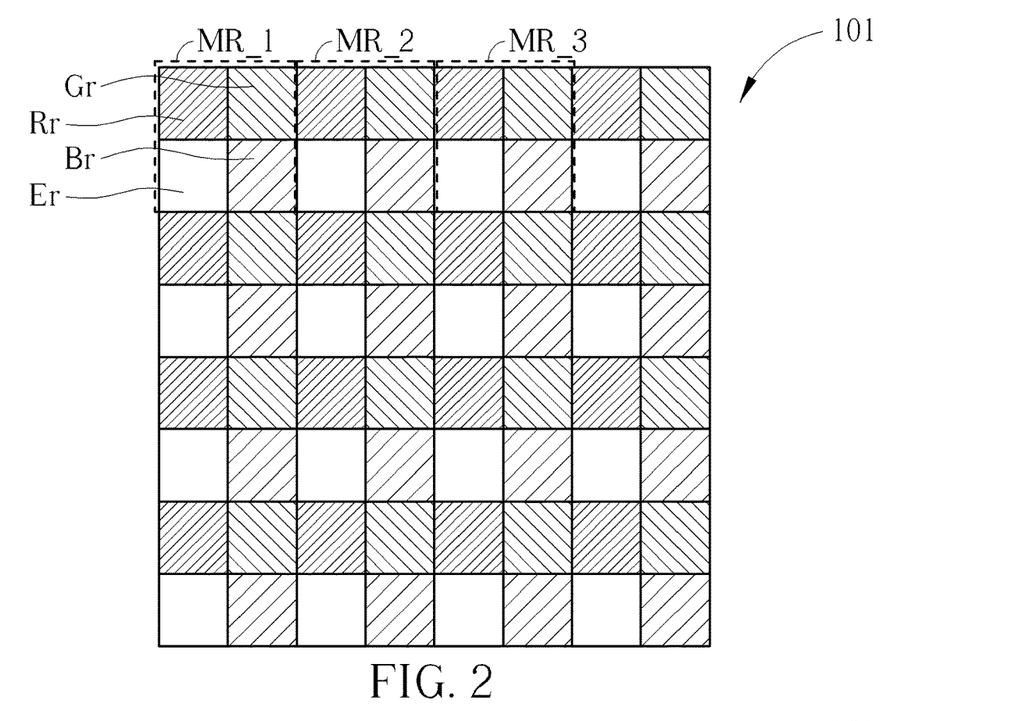
FIG. 2 and FIG. 3 are examples for the optical sensor in FIG. 1.
Figure 3:
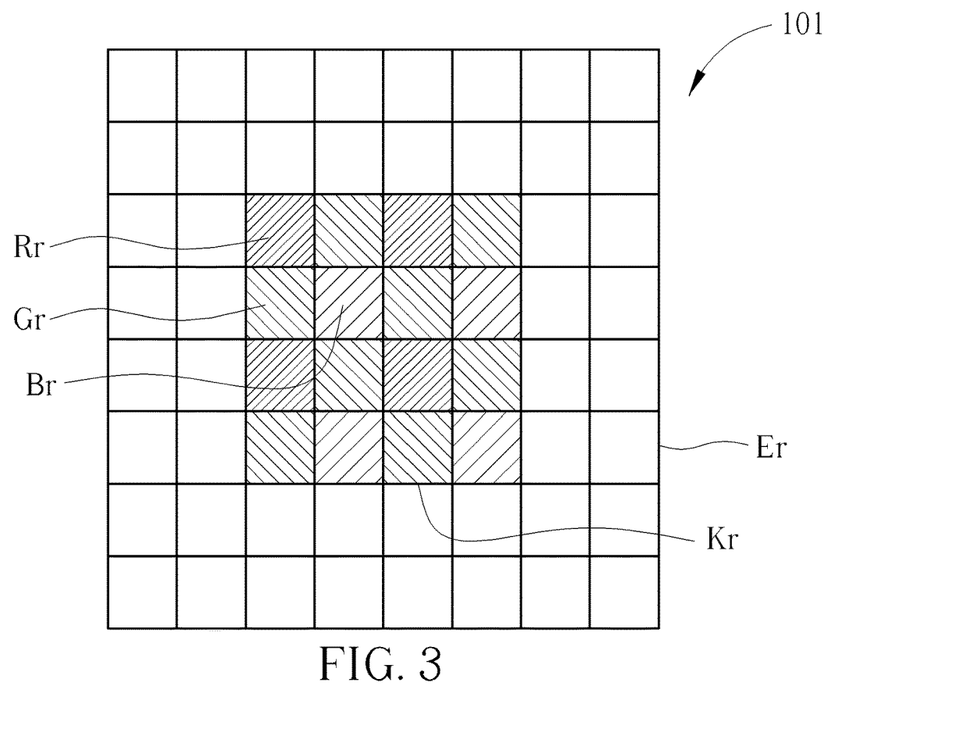

FIG. 2 and FIG. 3 are examples for the optical sensor 101 in FIG. 1. In the example of FIG. 2, the optical sensor 101 comprises a plurality of mix regions MR_1, MR_2, MR_3, which have square shapes. Please note, for the convenience of understanding, only three mix regions MR_1, MR_2, MR_3 are marked. The mix regions MR_1, MR_2, MR_3 have identical shapes, and each of them comprises a part of the kind determining region and a part of the element analyzing region. Take the mix region MR_1 for example, in the embodiment of FIG. 3, the kind determining region comprises a red region Rr, a green region Gr and a blue region Br. The red region Rr, the green region Gr and the blue region Br respectively occupies one quarter of the mix region MR_1, thus the kind determining region occupies three quarters of the mix region MR_1. Also, the element analyzing region Er occupies one quarter of the mix region MR_1.

Please note the arrangement for the kind determining region and the element analyzing region is not limited to the embodiment illustrated in FIG. 2. For example, as illustrated in FIG. 3, the element analyzing region Er is surrounding the kind determining region Kr, which also comprises the red region Rr, the green region Gr and the blue region Br. In other words, the element analyzing region Er is a square with a hollow part, and the kind determining region Kr is a square located in the hollow part.

Figure 4:
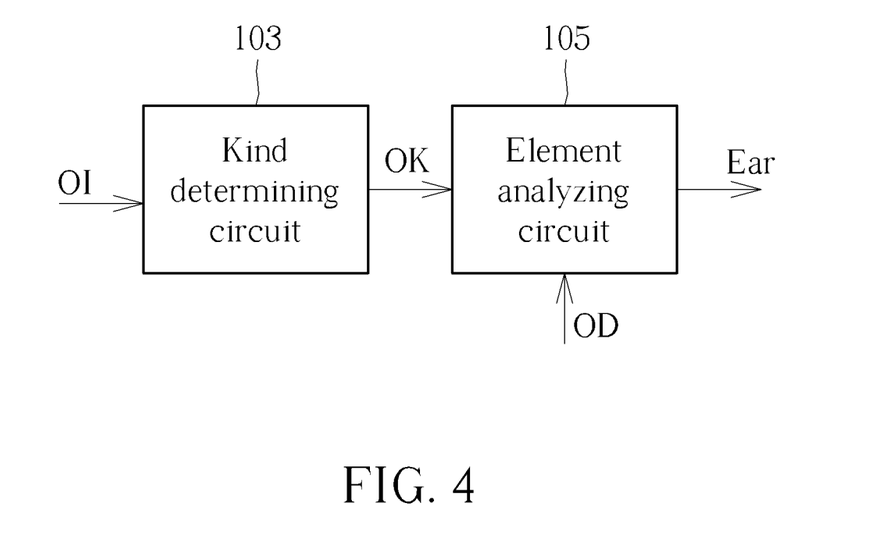
FIG. 4 is a schematic diagram illustrating operations for the kind determining circuit and the element analyzing circuit according to one embodiment of the present invention.

FIG. 4 is a schematic diagram illustrating operations for the kind determining circuit and the element analyzing circuit according to one embodiment of the present invention. As above-mentioned, firstly the kind determining circuit 103 determines an object kind OK of the object (ex. an apple, a plate, a glass . . . etc.) according to the object image OI. After that, the kind determining circuit 103 transmits the object kind OK to the element analyzing circuit 105, to analyze element (ex. sweetness, water content, metal content . . . etc.) of the object according to the element analyzing optical data OD and element analyzing data base related with the object. For example, if the optical sensor 101 captures an image of an apple, the kind determining circuit 103 can refer a kind determining data base stored in a storage device 107 in FIG. 1 to determine the object in the image is an apple. Then, the element analyzing circuit 105 analyzes element of the object according to the element analyzing optical data OD and an element analyzing data base related with an apple. In one embodiment, the element analyzing data base can be stored in the storage device 107 in FIG. 1 as well. Please note, the above-mentioned kind determining data base and element analyzing data base are not limited to be acquired from a storage device in the object determining system 100.

The above-mentioned "object kind" can have different detail levels. For example, the kind determining circuit 103 can determine the object is "apple" according to the object image OI. However, the kind determining circuit 103 can further determine the object is "granny smith" or a "Fugi apple" according to the object image OI. How detail the "object kind" is can be decided based on the content of the kind determining data base and the setting provided by the user.

In one embodiment, the element analyzing circuit 105 and the kind determining circuit 103 can be implemented by independent hardware. For example, the kind determining circuit is implemented by a sub-controller (ex. an IC) and the element analyzing circuit is implemented by a main controller (ex. a processor dependent from the IC) independent from sub-controller. Also, the main controller is in a sleep mode until the sub-controller wakes up the main controller. The sub-controller can wake up the main controller while it determines an object exists, or wake up the main controller while a user triggers the function of "analyzing an object". By this way, the power consumption can be decreased since the element analyzing circuit 105 needs more power to perform more data computing to analyze an element of the object.

Figure 5:
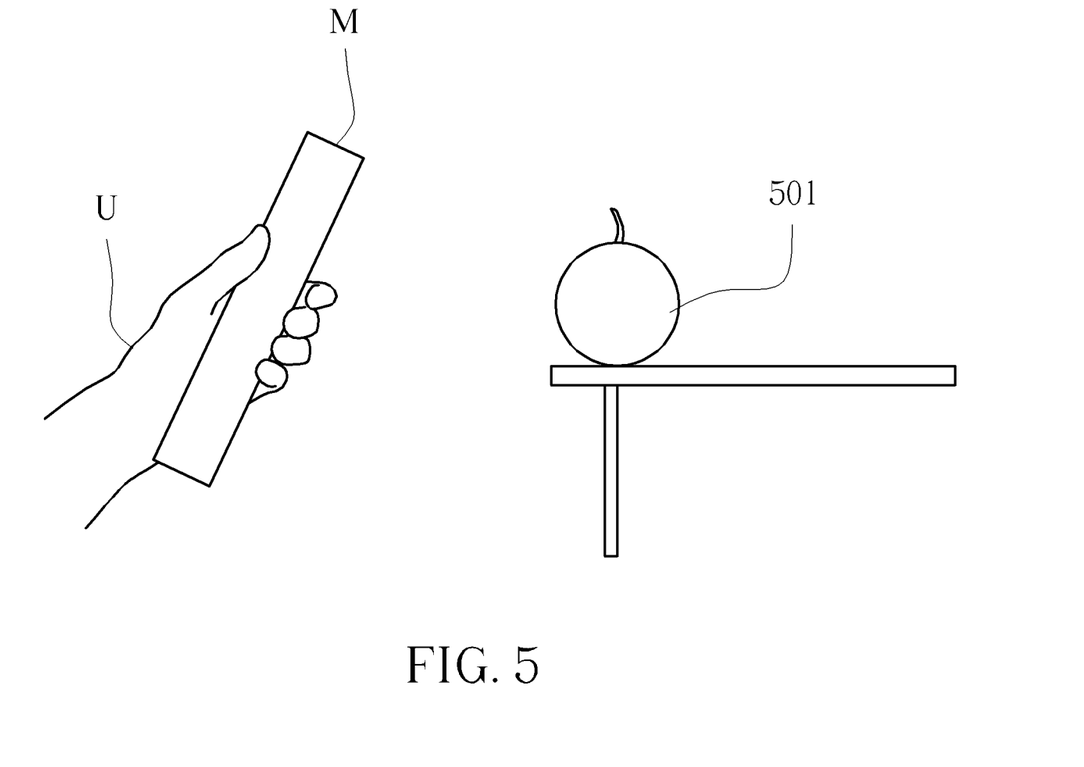
FIG. 5 is an example for a practical application for the object determining system illustrated in FIG. 1.

FIG. 5 is an example for a practical application for the object determining system 100 illustrated in FIG. 1. Please refer to FIG. 1-3 and FIG. 5 to understand the concept of the present invention for more clear. In one embodiment, the object determining system 100 is provided in a mobile phone M. A user U uses the mobile phone M to take a picture for an object 501 (i.e. capture an object image) via the kind determining region Kr of the optical sensor 101, and the kind determining circuit 103 determines the object 501 is an apple based on the picture. Element analyzing optical data OD is also acquired via the element analyzing region Er of the optical sensor 101. Moreover, the kind determining circuit 103 transmits the object Ok to the element analyzing circuit 105. After that, the element analyzing circuit 105 analyzes element of the object 501 according to the element analyzing optical data OD and an element analyzing data base related with an apple, to generate an element analyzing result Ear.

Please note, the object determining system 100 provided by the present invention is not limited to be applied to a mobile phone. In one embodiment, the object determining system 100 is provided in an electronic apparatus having a processing circuit, which is configured to select an operation mode of the electronic apparatus based on the element analyzing result from the element analyzing circuit 105. The processing circuit can be integrated to the kind determining circuit 103 and/or the element analyzing circuit 105, or be independent from the kind determining circuit 103 and/or the element analyzing circuit 105.

In one embodiment, the electronic apparatus is an optical tracking apparatus, and the processing circuit selects a tracking mode of the electronic apparatus based on the element analyzing result. For example, the electronic apparatus is an optical mouse, which can analyze the element for a mouse pad below the optical mouse. In such example, the processing circuit can select a high tracking mode or a low tracking mode of the electronic apparatus based on the element for the mouse pad.

In another embodiment, the electronic apparatus is a clean machine, and the processing circuit selects a clean power of the electronic apparatus based on the element analyzing result. For example, the electronic apparatus is a vacuum cleaner or a robot cleaner, which can analyze the ground there below. In such example, the processing circuit can select a powerful clean mode or a weak clean mode (i.e. select a clean power) of the electronic apparatus based on the element for the ground.

In still another embodiment, the electronic apparatus is a smart wearable electronic apparatus, and the processing circuit selects a light emitting mode or a parameter calculating mode of the electronic apparatus based on the element analyzing result. For example, the electronic apparatus is a smart watch or a smart bracelet, which can analyze the object there below. In such example, the processing circuit can select a light emitting mode or a parameter calculating mode (i.e. use which calculating algorithm) of the electronic apparatus based on the condition for the object below the electronic apparatus. For example, a proper light emitting mode or a parameter calculating mode can be selected based on whether the electronic apparatus touches the skin of a user. For another example, a proper light emitting mode or a parameter calculating mode can be selected based on whether the object is a living object or a non-living object. The above-mentioned parameter calculating can mean, for example, calculating a heart rate of a user, or calculating a blood pressure of the user.

Briefly, the above-mentioned embodiments apply two stage steps to analyze an object. The first stage step determines the object kind and the second stage step analyzes the element of the object based on the object kind. The concept of two stage steps can be implemented in another aspect, as explained in following embodiments of the present invention.

Figure 6:
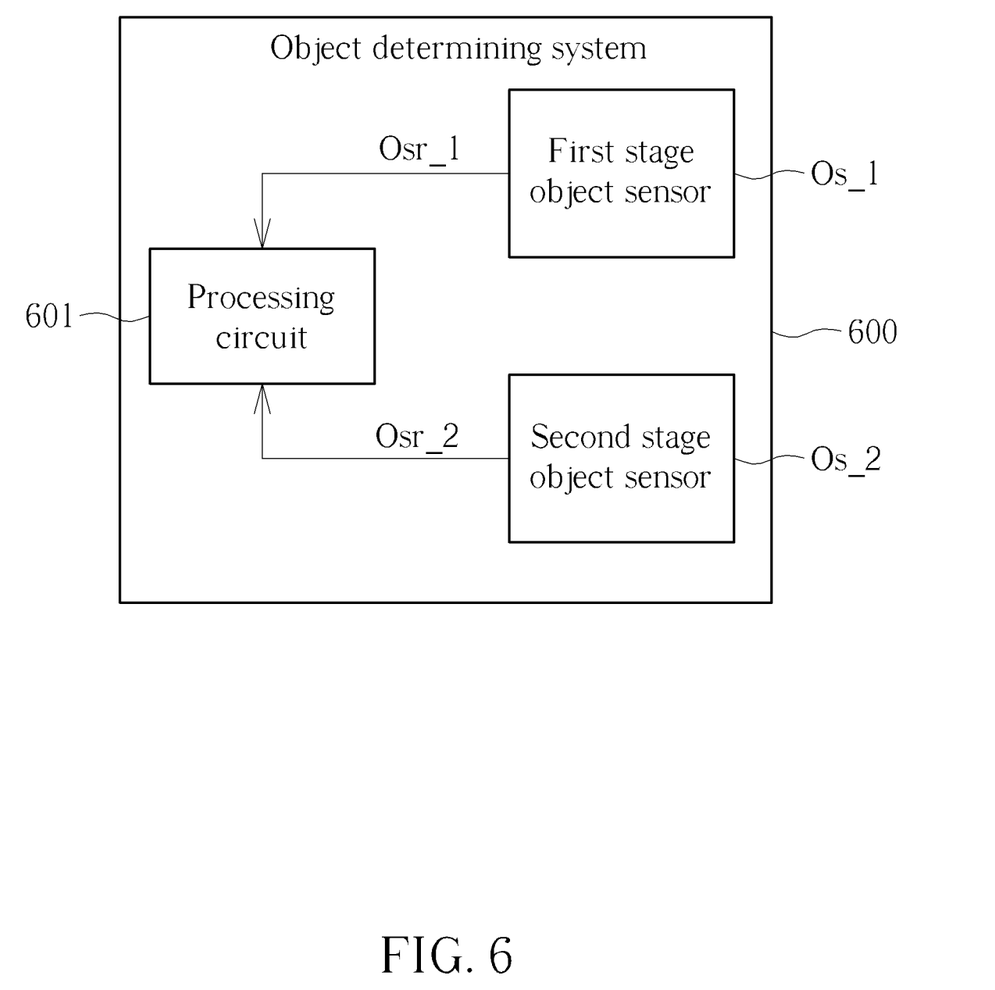
FIG. 6 is a block diagram illustrating an object determining system according to another embodiment of the present invention.

FIG. 6 is a block diagram illustrating an object determining system according to another embodiment of the present invention. As illustrated in FIG. 6, the object determining system 600 comprises a processing circuit 601, a first stage object sensor Os_1 and a second stage object sensor Os_2. The first stage object sensor Os_1 is configured to generate a first stage object sensing result Osr_1. The second stage object sensor Os_2 is configured to generate a second stage object sensing result Osr_2 of an object if the processing circuit 601 determines the object exists in a predetermined range of the object determining system 600 based on the first stage object sensing result Osr_1. After that, the processing circuit 601 further determines an object kind of the object based on the second stage object sensing result Osr_2.

In one embodiment, the object determining system 600 further comprises a line light source configured to generate line light and an area light source configured to generate plane light. In such embodiment, the first stage object sensor Os_1 generates the first stage object sensing result Osr_1 based on the line light, and the second object sensor Os_2 generates the second object detecting result Osr_2 based on the square light. It will be appreciated that the first stage object sensor Os_1 and the second stage object sensor Os_2 can operate in any kind of light.

FIG. 7-11 are schematic diagrams illustrating operations for an object determining system according to embodiments of the present invention. In these embodiments, the object determining system 600 is provided in a robot cleaner 700. Also, in these embodiments the above-mentioned first stage object sensor Os_1 is a depth sensor and the second stage object sensor Os_2 is an image sensor. Therefore, the first stage object sensing result Osr_1 is depth information and the second object sensor Os_2 is an image. The depth sensor can be, for example, a laser depth sensor or any other optical sensor.

Figure 7:
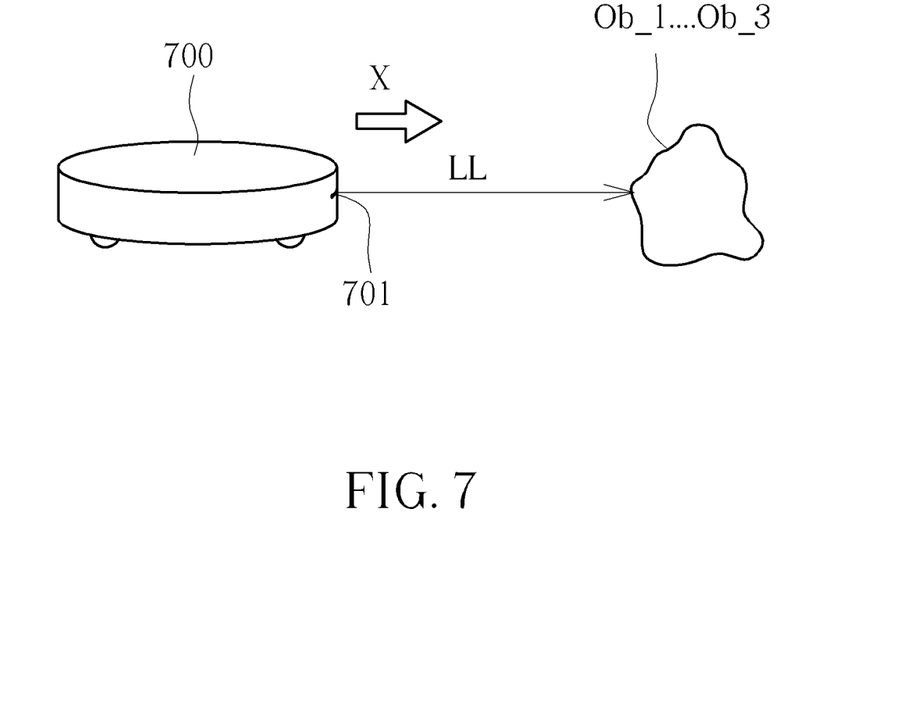
FIG. 7-11 are schematic diagrams illustrating operations for an object determining system according to embodiments of the present invention.
Figure 8:
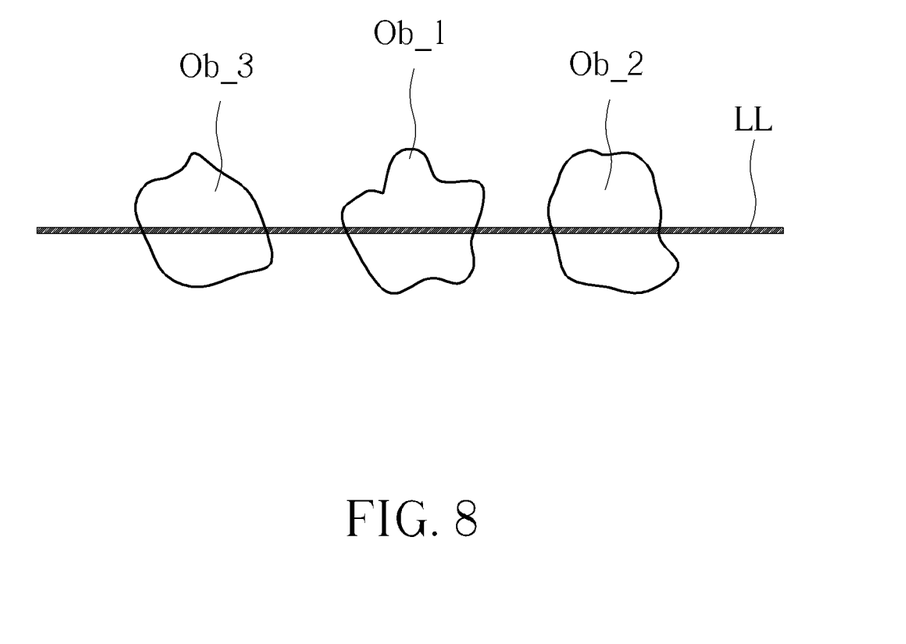

As illustrated in FIG. 7 and FIG. 8 which is a schematic diagram following a view in the X direction in FIG. 7, in a first stage object sensing step, the robot cleaner 700 applies the line light source 701 to emit line light LL, and applies the processing circuit 601 to determine if any object exists in a predetermined range of the robot cleaner 700 (i.e. in a predetermined range of the object determining system) based on first stage object sensing result Osr_1. If no object exists in a predetermined range of the robot cleaner 700, the depth sensed by the first stage object sensor Os_1 is large. On the opposite, if object exists in a predetermined range of the robot cleaner 700, the depth sensed by the first stage object sensor Os_1 is small. Therefore, the depth sensor can be applied to sense if any object exists in a predetermined range of the robot cleaner 700. Moreover, since only the existence for the object is determined in the first stage object sensing step, no details of the object is needed. Therefore, the line light source 701 can provide enough light to determine the existence of the object.

In the embodiments illustrated in FIG. 7 and FIG. 8, the objects Ob_1-Ob_3 is in front of the robot cleaner 700 (i.e. in a predetermined range of the robot cleaner 700), thus the line light LL from the line light source 701 can emit the objects Ob_1-Ob_3 and the processing circuit 601 can determine the objects Ob_1-Ob_3 exist according to the sensing result of the first stage object sensor Os_1 generated based on the line light LL.

Figure 9:
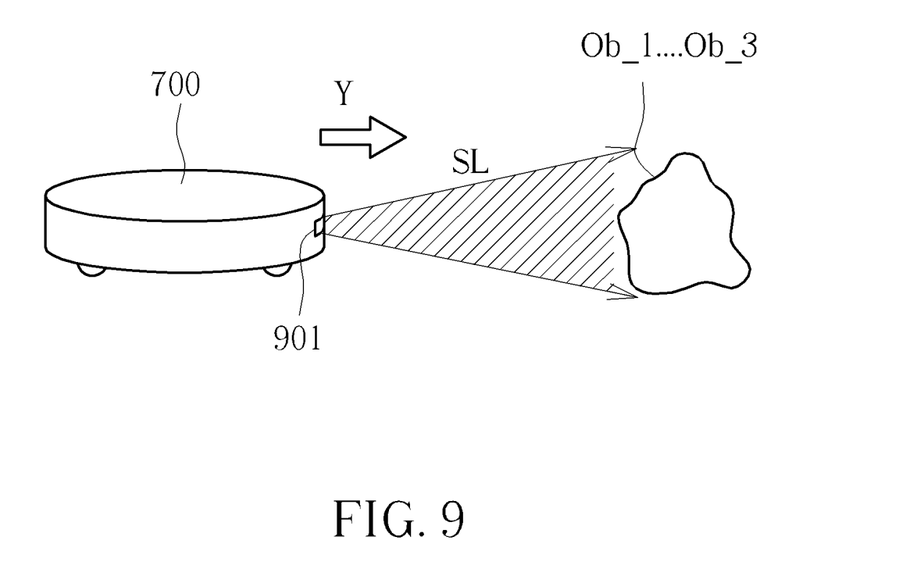
Figure 10:
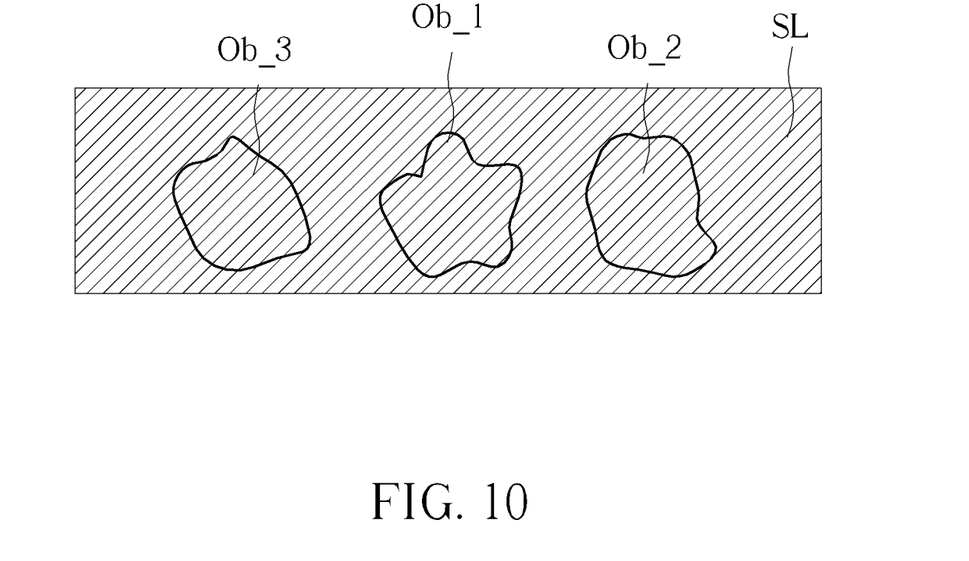

In the second stage object sensing step, as illustrated in FIG. 9 and FIG. 10 which is a schematic diagram following a view in the Y direction in FIG. 9, the robot cleaner 700 applies the area light source 901 to emit square light SL, and applies the processing circuit 601 to determine an object kind of the object according to the second stage object sensing result Osr_2 (object image in this embodiment) generated based on the square light SL. Since the object kind is determined in the second stage object sensing step, more details for the object maybe needed, thus applying area light source 901 is more helpful for determining the object kind. In one embodiment, the object kind can be determined, for example, an object kind data based stored in the storage device 107 or any other storage device.

Please note, the first stage object sensor Os_1 is not limited to a depth sensor and the second stage object sensor Os_2 is not limited to an image sensor. Any sensor which can be applied to implement the above-mentioned functions should fall in the scope of the present application. For example, in one embodiment, the first stage object sensor is a thermal sensor. Also, the second object sensor can be a thermal sensor as well.

Also, in one embodiment, the second object sensor Os_2 is in a sleep mode until the processing circuit 601 determines the object exists in the predetermined range of the robot cleaner 700 based on the first stage object sensing result Osr_1. Since the second object sensor Os_2 needs more power than the first object sensor Os_1, more power can be saved by this way.

Besides, in one embodiment, the object determining system 600 further comprises a third stage object sensor (not illustrated), which is configured to generate a third stage object sensing result of the object if the processing circuit 601 determines the object exists in the predetermined range of the object determining system 600 based on the first stage object sensing result Osr_1. After that, the processing circuit 601 determines the object kind based on both the second stage object sensing result and the third stage object sensing result. In such embodiment, the second object sensor Os_2 is an image sensor and the third stage object sensor is a thermal sensor.

After the object kind is determined, the above-mentioned robot cleaner 700 can operate based on the object kind. For example, if the object kind indicates the object is a dirty stuff such as stool, the robot cleaner 700 may stop or turn to another direction to avoid the object, or the ground may become horrible if the robot cleaner 700 tries to clean the object. Also, if the object is a sharp object such as a nail, the object may break the robot cleaner 700 if the object is sucked into the robot cleaner 700. It should be noted that the object determining system 600 is not limited to be applied to a robot cleaner 700. The object determining system 600 can be applied to any other electronic apparatus which can operate based on the determined object kind.

Figure 11:
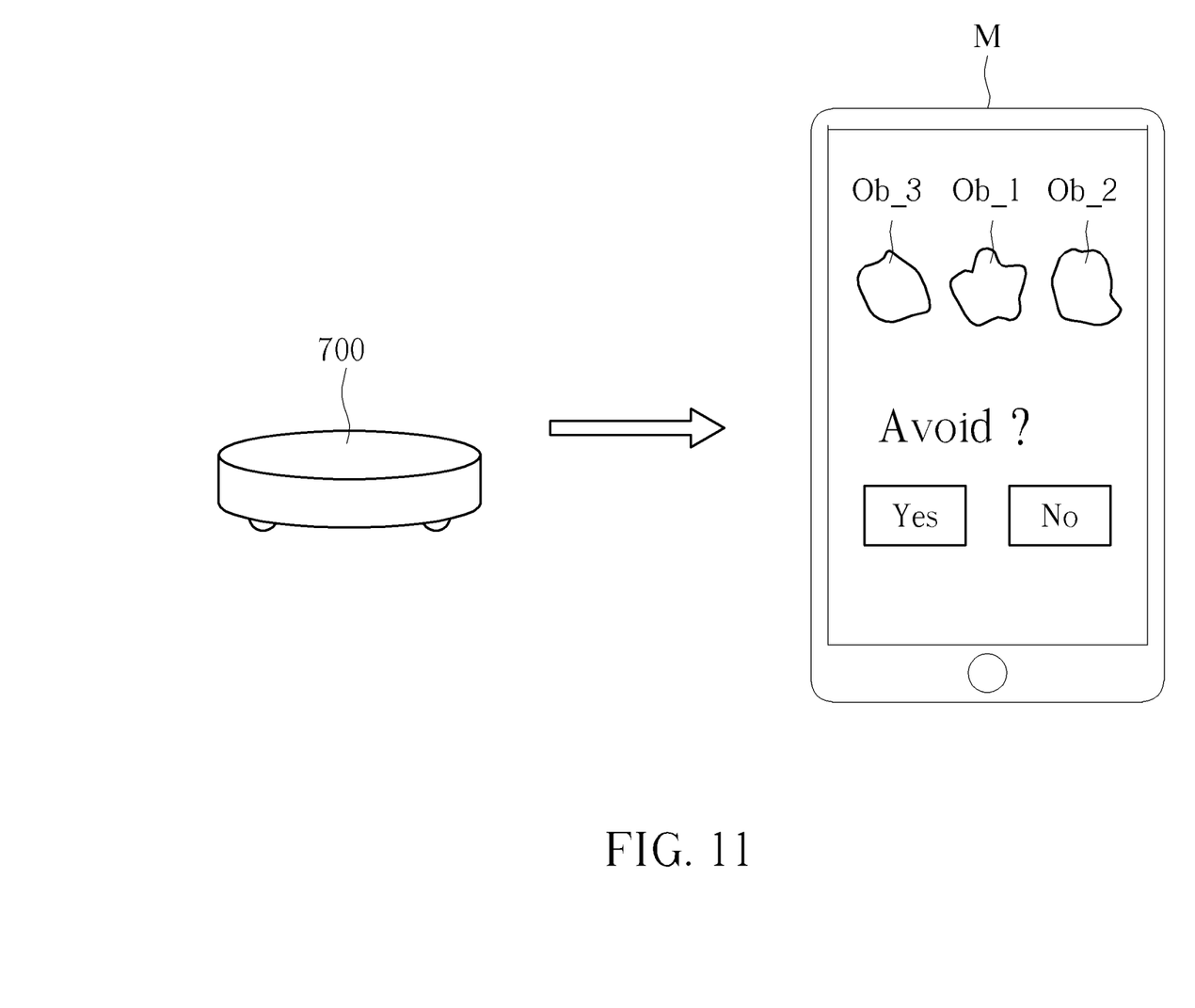

In one embodiment, the second stage object sensing result Osr_2 can further be applied to optimize the object kind data base. As illustrated in FIG. 11, in one embodiment, a user uses a mobile phone M to control the robot cleaner 700, and the second stage object sensing result Osr_2 is an object image. In such case, the object determining system in the robot cleaner 700 can transmit the second stage object sensing result Osr_2 to the mobile phone of the user, and the user can determine if the second stage object sensing result Osr_2 shows an object needed to be avoided. If the user determines the object is needed to be avoided, he can send a confirm command (ex. press the "yes" icon in FIG. 11) via the mobile phone M to the robot cleaner 700, and the robot cleaner 700 can optimize the object kind data base based on the confirm command from the user.

Object determining methods can be acquired based on above-mentioned embodiments, but are not illustrated for brevity here.

In view of above-mentioned embodiments, the object kind or object element can be automatically acquired, and an electronic apparatus can correspondingly select a proper operation based on the object kind or object element. Therefore, the issues for prior art can be resolved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object determining system, comprising:
   a processing circuit;
   a first stage object sensor, configured to generate a first stage object sensing result; and
   a second stage object sensor, configured to generate a second stage object sensing result of an object if the processing circuit determines the object exists in a predetermined range of the object determining system based on the first stage object sensing result;
   wherein the processing circuit further determines an object kind of the object based on the second stage object sensing result;
   wherein the object determining system further comprises:
   a third stage object sensor, configured to generate a third stage object sensing result of the object if the processing circuit determines the object exists in the predetermined range of the object determining system based on the first stage object sensing result;
   wherein the processing circuit determines the object kind based on the second stage object sensing result and the third stage object sensing result.

2. The object determining system of claim 1, further comprising:
   a line light source, configured to generate line light; and
   an area light source, configured to generate plane light;
   wherein the first stage object sensor generates the first stage object sensing result based on the line light;
   wherein the second stage object sensor generates the second object detecting result based on the plane light.

3. The object determining system of claim 1, wherein the first stage object sensor is a depth sensor or a thermal sensor.

4. The object determining system of claim 1, wherein the second stage object sensor is an image sensor or a thermal sensor.

5. The object determining system of claim 1, wherein the second stage object sensor is an image sensor and the third stage object sensor is a thermal sensor.

6. The object determining system of claim 1, wherein the second stage object sensor is in a sleep mode until the processing circuit determines the object exists in the predetermined range of the object determining system based on the first stage object sensing result.

7. The object determining system of claim 1, wherein the processing circuit further transmits the second stage object sensing result to a user for confirming.

* * * * *